(12) United States Patent
Levin

(10) Patent No.: US 6,189,946 B1
(45) Date of Patent: Feb. 20, 2001

(54) VEHICLE SAFETY SYSTEM

(76) Inventor: Abraham Levin, 76 Grimboim Street, Haifa 34987 (IL)

( * ) Notice: Under 35 U.S.C. 154(b), the term of this patent shall be extended for 0 days.

(21) Appl. No.: 09/235,446

(22) Filed: Jan. 22, 1999

(30) Foreign Application Priority Data

Aug. 24, 1998 (IL) ........................................................ 125902

(51) Int. Cl.$^7$ ........................................................ B60N 2/12
(52) U.S. Cl. ........................ 296/68.1; 297/216.18; 297/216.19; 297/329
(58) Field of Search ................... 296/68.1, 65.01, 296/63, 65.13; 297/216.19, 216.18, 216.16, 216.14, 216.11, 216.1, 344.1, 344.11, 329

(56) References Cited

U.S. PATENT DOCUMENTS

| 3,782,769 | * | 1/1974 | Fader et al. ........................ 293/134 |
| 3,992,046 | * | 11/1976 | Braess ................................ 296/68.1 |
| 3,998,291 | * | 12/1976 | Davis ................................. 296/68.1 |
| 5,244,252 |   | 9/1993 | Serber .............................. 297/216.19 |
| 5,366,269 | * | 11/1994 | Beauvais ......................... 297/216.19 |
| 5,437,494 | * | 8/1995 | Beauvais ......................... 297/216.19 |
| 5,460,427 |   | 10/1995 | Serber .............................. 297/216.19 |
| 5,636,424 |   | 6/1997 | Singer et al. ....................... 29/407.01 |
| 5,947,543 | * | 9/1999 | Hubbard ............................... 296/68.1 |

FOREIGN PATENT DOCUMENTS

| 226495 | 9/1997 | (JP) . |
| WO 9422692 | 10/1994 | (WO) . |

* cited by examiner

Primary Examiner—D. Glenn Dayoan
Assistant Examiner—Patricia Engle
(74) Attorney, Agent, or Firm—Van Dyke, Gardner, Linn & Burkhart, LLP

(57) ABSTRACT

A safety system for a motor vehicle having a chassis, including a vehicle chair mounted on the chassis for slidably and rotational movement relative to the chassis under inertial forces above a pre-selected threshold acting on the seat and rider in the event of vehicle collision. The vehicle seat is arranged for angular rotation through a gradually growing radius, simultaneously with, and in a direction opposite to, the slidable linear movement of the vehicle seat. Chest and abdomen safety belts are affixed to the vehicle chair. A spring damper system, capable of undergoing large deformation, couples the vehicle seat to the chassis. Preferably, the spring damper system is non-linear, whose stiffness and/or damping coefficients grow with displacement.

27 Claims, 16 Drawing Sheets

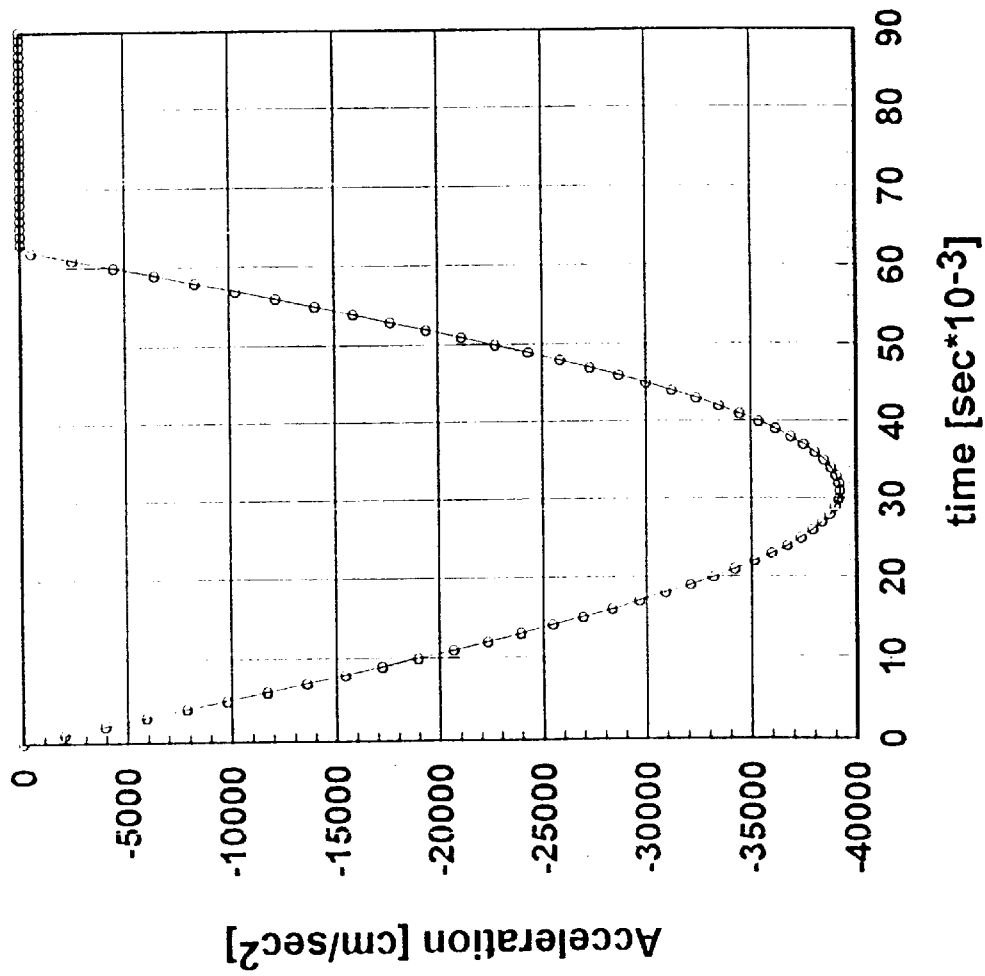

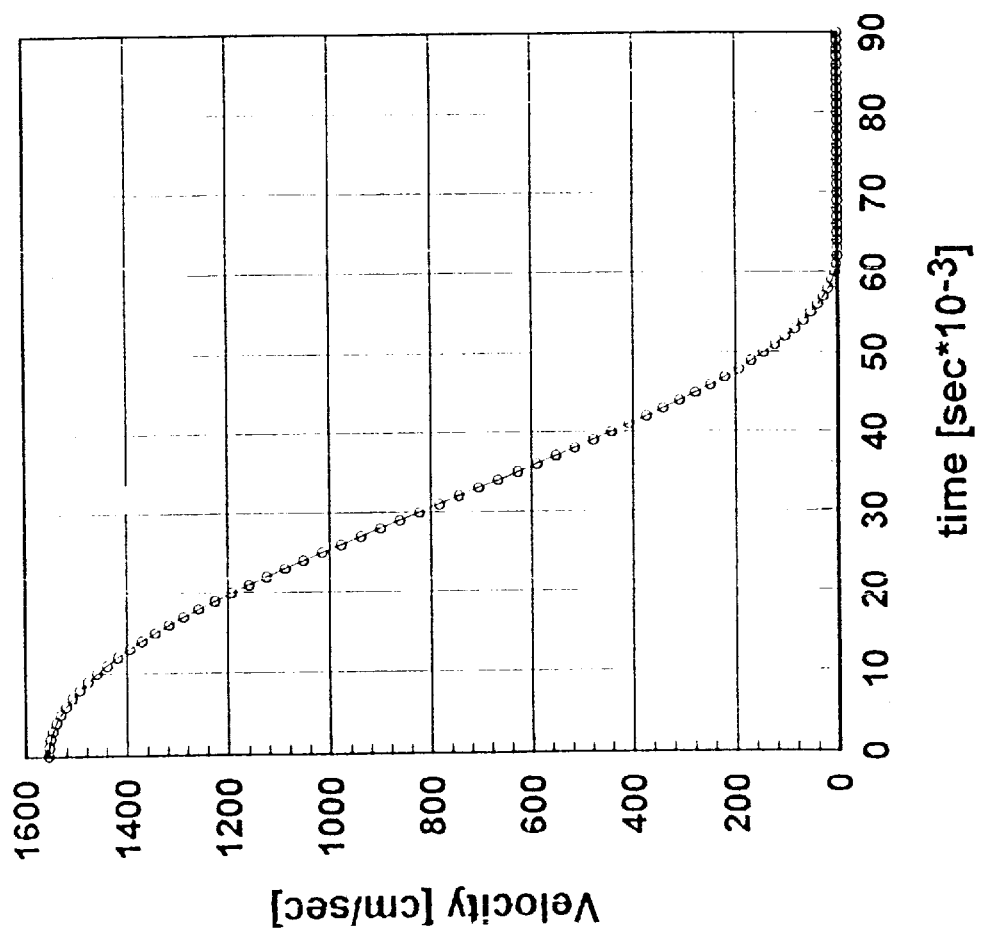
Figure 8 - Vehicle Velocity (collision model)

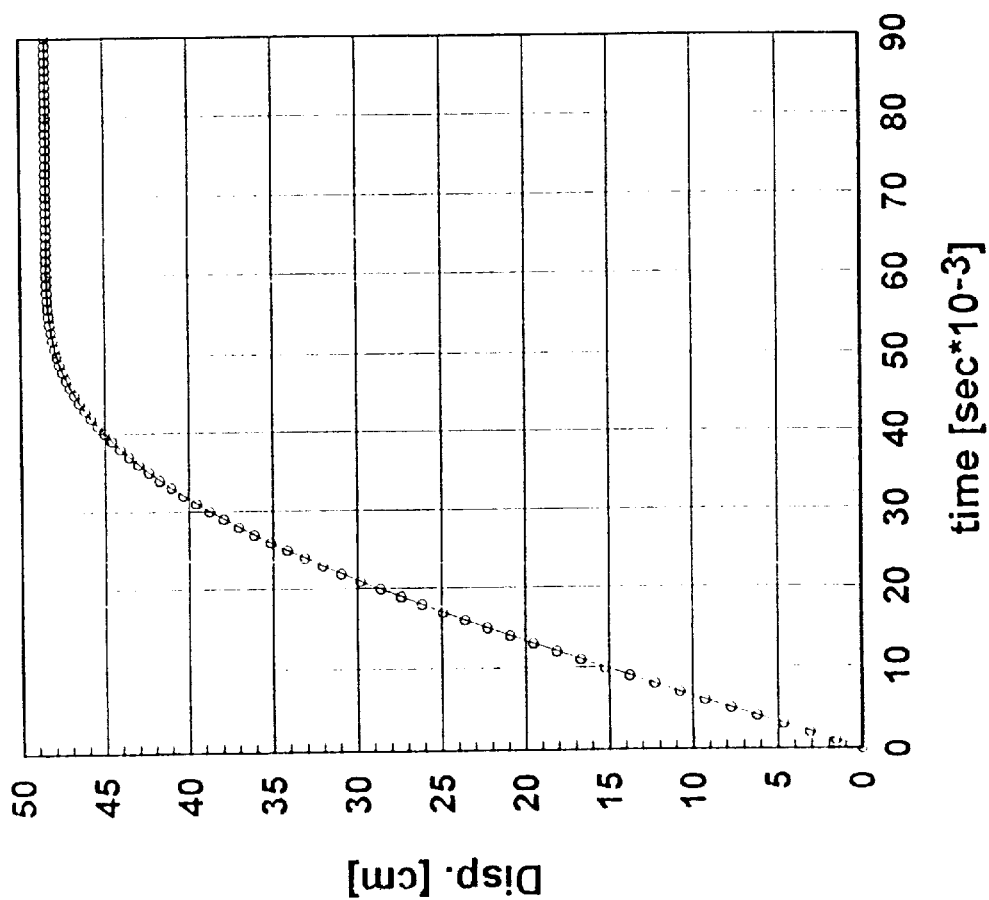
Figure 9 - Vehicle Displacment (collision model)

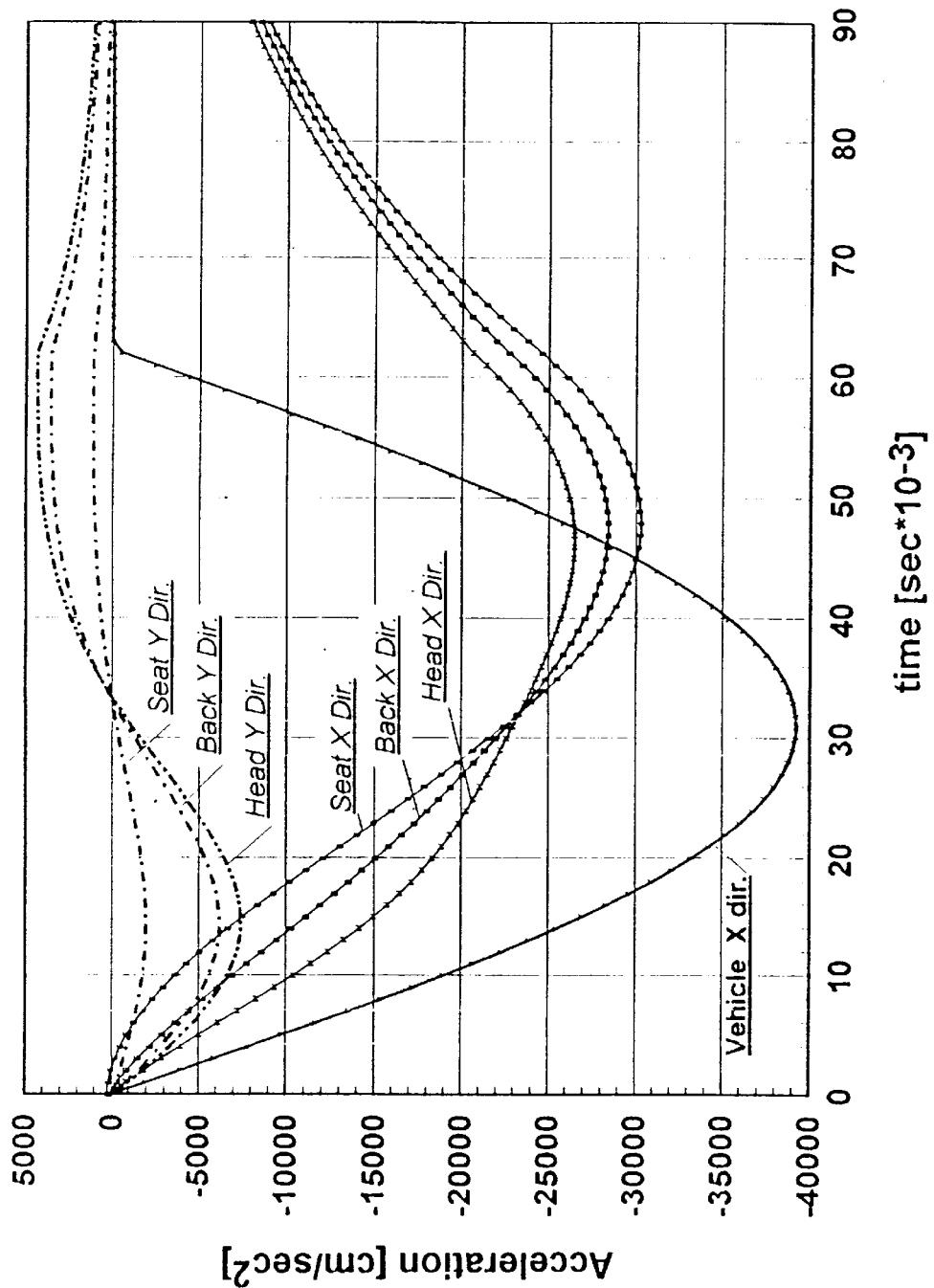
Figure 10 - Vehicle & Chair Components Acceleration

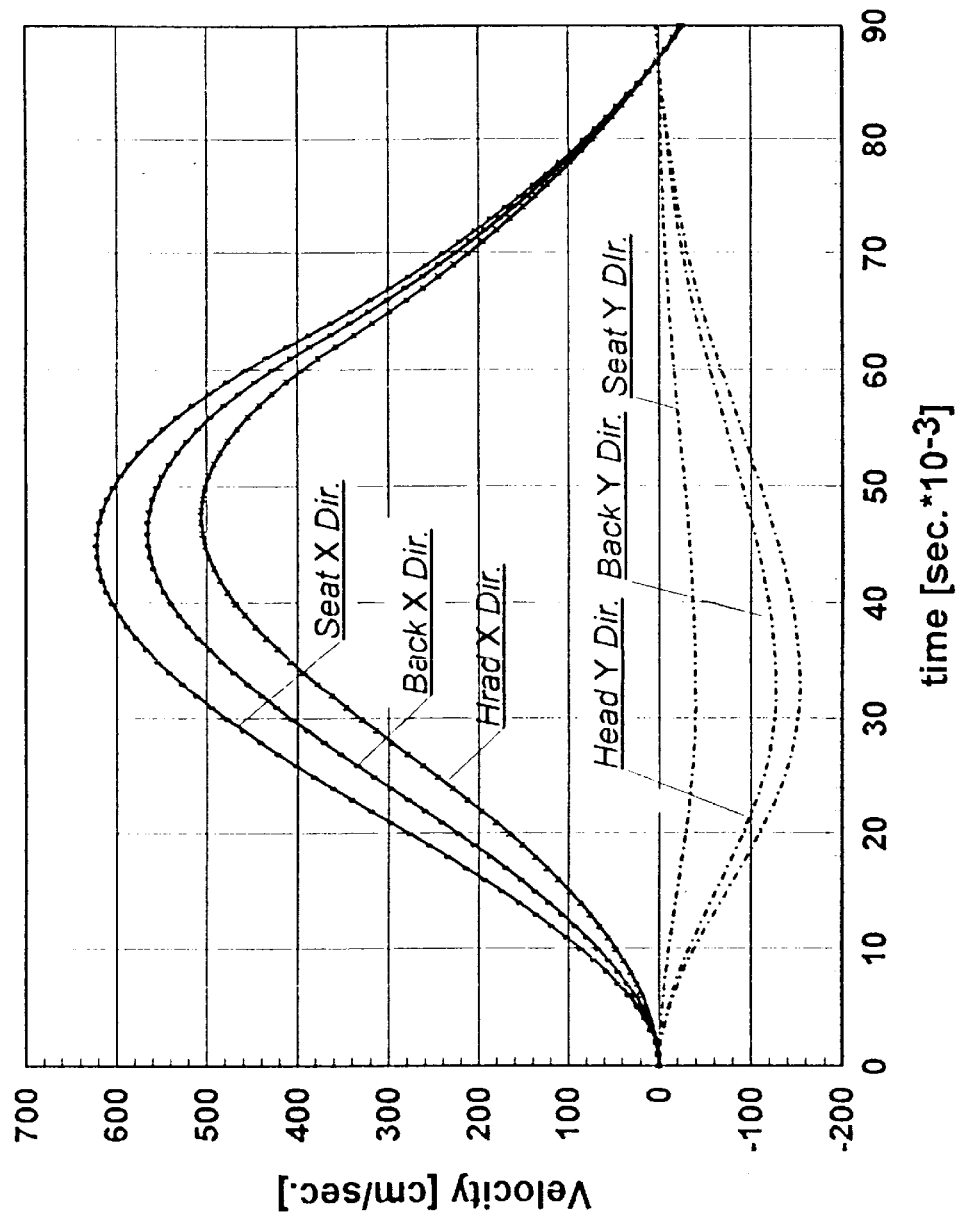
figure 11 - Chair components Velocity relative to vehicle

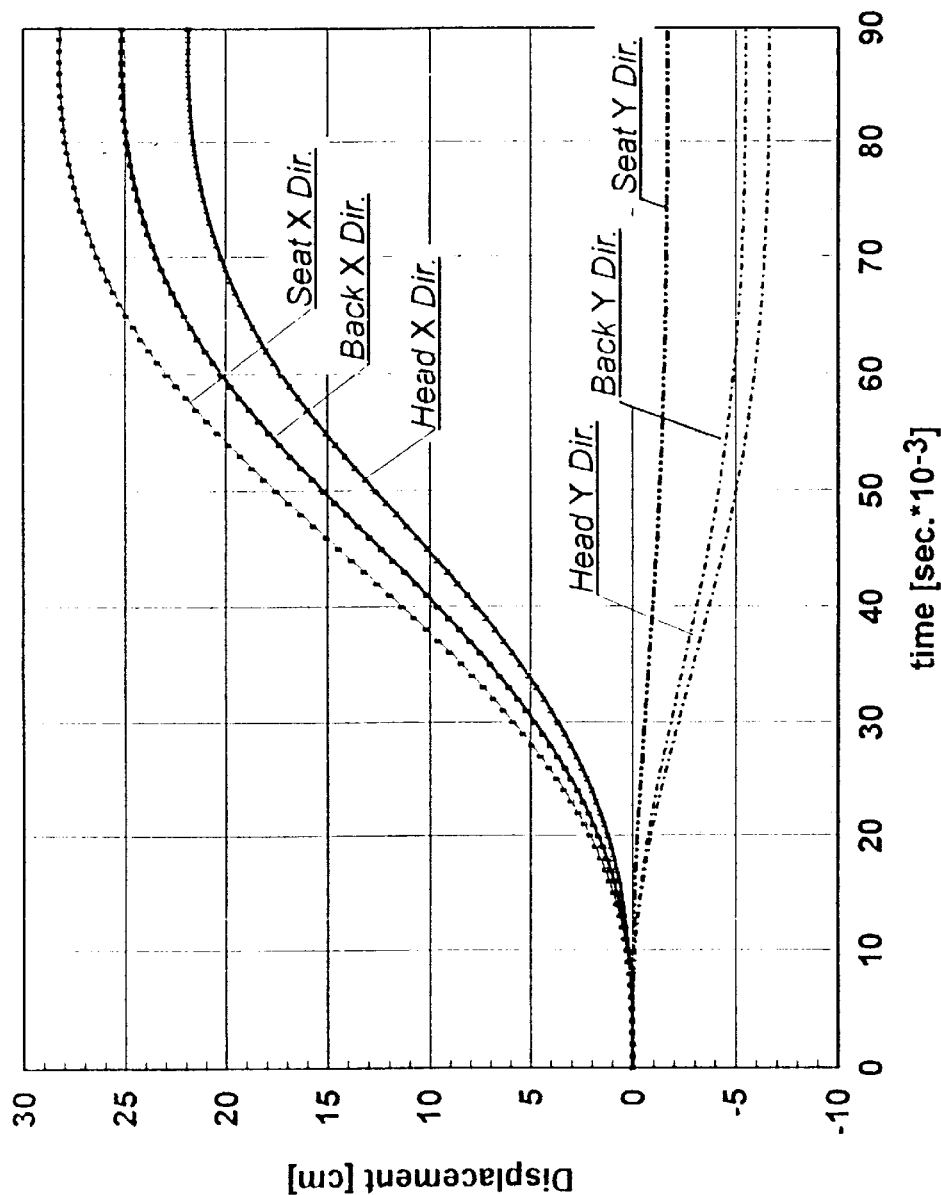
Figure 12 - Chair components Displacement relative to Vehicle

VEHICLE SAFETY SYSTEM

FIELD OF THE INVENTION

The present invention relates to car safety devices in general and, in particular, to a device and method for reducing rider injuries in the event of a motor vehicle collision.

BACKGROUND OF THE INVENTION

In order to reduce riders' injuries in the event of a motor vehicle collision, two major safety devices have been introduced: the safety belt, and the air bag.

The safety belt prevents riders from being thrown towards the windscreen in the event of collision. This device has proven effective at low urban vehicle speeds. However, when vehicle speed increases towards the interurban speeds, the safety belt itself becomes a source of injuries. Due to the substantial inertia forces exerted on a rider's body, the abdomen and chest can be crushed by the relatively stiff belt, which prevents any relief from high decelerations exerted on the rider's body by energy absorbent displacements.

The introduction of the air bag, as a supplement to the safety belt, was intended to soften the blow from the rider-safety belt operation. Unfortunately, the short time response of the safety belt, due to its relatively high stiffness, versus the deployment time of the air bag (depending, mainly, on gas pressure generated by a pyrotechnic tablet), called for highly accelerating the air bag, to catch up with the safety belt time response, in order to ensure the simultaneous operation of both. Therefore, an extremely high air bag velocity of 320 km/h is needed for the air bag and safety belt to operate simultaneously.

The worrisome number of injuries, caused by air bags fired towards rider's chests and head, revealed the air bag as a new source of a potential hazard. Although the air bag may be considered as a contribution to the total safety of vehicle riders, some inevitable new perceptions of the whole chair, safety belt, and air bag systems must be worked out to overcome the problems which remain unsolved.

A number of solutions to the problem of deceleration forces acting on a rider during a collision have been proposed in the patent literature. For example, there is shown in U.S. Pat. No. 5,244,252 to Serber a seat assembly for a vehicle which includes a seat, a seat back, and mounting means mounting the seat for movement in fore and aft directions in the vehicle along an upwardly concave arcuate path. This seat assembly is designed to prevent "submarining", wherein the body slides away from the seat, out from under the seatbelt. The arcuate path has a radius of curvature which is sufficiently large to timely move in front of and to contain the person's buttocks so as to reduce deceleration and maintain frictional contact of the person's buttocks with the seat. The seat belt is coupled to the chassis adjacent the seat back, and the seat is not coupled to the seat back, so the effect is to fold the person's body at the waist.

There is shown in WO94/22692 to Muller, a process for reducing the forces acting on a passenger belted into a seat in a vehicle when the vehicle collides with an obstacle. The approach to an obstacle is detected and evaluated by proximity detectors acting as sensors and, when a collision is recognized as inevitable, the seat is accelerated against the collision direction, stopped at the end of its travel and, once the collision has occurred, the seat is moved in the collision direction and stopped at the end of its travel. Preferably, an airbag system is actuated at the same time as the movement of the seat, possibly by the proximity detection system.

This proposal suffers from several disadvantages. First, any proximity detector system is subject to failure or accidental actuation. If the sensor indicates there will be a collision, and there is no collision, the driver or passenger finds himself moving back within the vehicle, which can disrupt his concentration and provide difficulties returning the seat to its former position. Second, if there is not precise time correlation between the movement of the seat and the occurrence of the collision, the seat can be moving backwards at the time of impact. In this case, the forces acting on the person will be much greater than those caused by the impact alone, increasing the likelihood of injury. Third, when a driven sees he is about to crash, he will generally apply the brakes, causing his body to move forward. If he does so while the seat is moving away from the brake pedal, it can prevent effective braking of the vehicle, and also increase deceleration forces acting on his body. In addition, a linear spring is provided to absorb the energy in the piston at stop the seat at the end of its travel. However, due to bottoming, the seat will stop with a bump, in both directions.

There is shown, in Japanese laid-open publication 9-226495 (Mitsubishi), a passenger protection system for a vehicle including a seat movement unit to retreat a seat to a predetermined position on receipt of an air bag start signal. Simultaneously, a seat belt expansion unit expands a chest guard and an abdomen guard on the seat belt, which is attached to the vehicle chassis. In this system, the airbag is inflated upon impact above a threshold, at which time the vehicle seat moves away from the airbag. In this system, like that described above, the movement of the vehicle seat away from the airbag at the time of collision, increases, rather than decreases, the deceleration forces acting on the body.

A similar problem arises in the event of a rear end collision, especially which the vehicle is hit when stationary. In this case, the force of the collision causes the vehicle to accelerate in a forward direction, while the body of a rider moves backwards until it hits the back of the car seat. Due to the acceleration forces acting on the body, and the fact that the head support is generally not located in the ideal position to support the rider's head, a rider in this situation often suffers from whiplash.

Accordingly, there is a long felt need for a motor vehicle safety system which incorporates the operation of air bag and safety belt in such a way to provide maximum protection with minimum injuries from the safety devices themselves. In addition, it would be very desirable to have such a safety system which also provides protection in the event of a rear end collision.

SUMMARY OF THE INVENTION

According to the present invention, there is provided a safety system for a motor vehicle having a chassis, including a vehicle chair mounted on the chassis for slidable and rotational movement relative to the chassis under inertial forces above a pre-selected threshold acting on the seat and rider in the event of vehicle collision. Chest and abdomen safety belts are affixed to the vehicle chair. A spring damper system, capable of undergoing large deformation, couples the vehicle seat to the chassis.

According to a preferred embodiment, the spring damper system is non-linear, whose stiffness and/or damping coefficients grow with displacement.

The movement of the chair relative to the chassis is preferably subject to a constrained trajectory consisting of linear movement which may coincide with or be opposite the direction of vehicle motion, and angular rotation having a non-constant growing radius in the direction opposite to the chair motion. The dynamic response of the slidable chair system results in substantially reduced deceleration (or acceleration, depending upon the direction of the collision) acting on the chair and rider (compared to vehicle input). Moreover, combining the angular rotation aforementioned, with the linear movement, causes the rider's most vulnerable limbs, e.g. head and chest, to undergo the lowest decelerations in the case of a front end collision, accelerations in the case of a rear end collision, velocities and displacements (relative to the chassis). For front end collisions, the dynamic traits of the vehicle chair of the invention enable the air bag to complete its deployment just before the moving chair and rider encounter it. The effective velocity (in terms of air bag injuries) at which the rider encounters the air bag will be, in this case, the relative velocity between the chair and chassis. As will be shown later, it is substantially lower than the absolute velocity of the air bag deployment aforementioned. In a rear end collision, the dynamic traits of the vehicle chair provide reduction of the acceleration of the chair and rider relative to the vehicle, and enable the head support of the chair to approach the rider's head, thereby shortening the displacement of the head and reducing whiplash.

BRIEF DESCRIPTION OF THE DRAWINGS

The present invention will be further understood and appreciated from the following detailed description taken in conjunction with the drawings in which:

FIG. 7 is a graph illustrating the vehicle deceleration in a collision model;

FIG. 8 is a graph illustrating the vehicle velocity in a collision model;

FIG. 9 is a graph illustrating the vehicle displacement in a collision model;

FIG. 10 is a graph illustrating the vehicle and chair components' deceleration during a computer simulation;

FIG. 11 is a graph illustrating the chair components' velocity relative to the chassis during collision in a computer simulation;

FIG. 12 is a graph illustrating the chair components' displacement relative to the chassis during collision in a computer simulation;

DETAILED DESCRIPTION OF THE INVENTION

The present invention relates to a motor vehicle smart chair safety system, which combines the beneficial effects of safety belts with those of air bags, without the dangers associated with the use of either. The chair is mounted on the vehicle chassis, and has the ability to move in a constrained trajectory relative to the chassis under inertial forces above a pre-selected intensity. A spring damper system couples the smart chair to the chassis. This system acts basically as an energy absorber and also has the ability to undergo relatively large deformation (i.e., large displacement) and prevent any spring bottoming, which could cause undesirable sudden high decelerations. Preferably, the spring damper system is a non-linear spring damper system, having stiffness and/or damping coefficients, which grow gradually with displacement.

The constrained trajectory by which the chair moves relative to the chassis consists of linear movement along the longitudinal axis of the vehicle in a direction coinciding with, or contrary to, the vehicle motion, depending upon the direction of collision and, also includes angular rotation having a non-constant growing radius in the direction opposite to the chair motion. The dynamic characteristics of the chair setup combines two-fold benefits. (1) A substantial reduction of deceleration or acceleration acting on chair and rider as a whole (relative to vehicle input due to collision). (2) The composed angular rotation and linear movement distributes the decelerations or accelerations, as well as displacements and velocities, (relative to the chassis), in such a way that a rider's head and chest will undergo the least deceleration or acceleration, and velocity and displacement relative to the vehicle.

For ease of discussion, all persons sitting in such a seat are described herein as riders, whether they are drivers or passengers, and the vehicle seat or smart chair relates to any vehicle chair having safety belts and air bag. It will be appreciated that the vehicle or the present invention can include two separate sliding mechanisms for the vehicle chair. The first is the conventional sliding mechanism for adjusting the seat for the comfort of the individual rider and the length of his legs. The other is that provided by the invention, activated only under collision forces above a predefined threshold. It is possible to arrange these mechanisms serially, one on top of the other. Preferably, the safety mechanism is mounted directly on the chassis, with the conventional mechanism, for comfort, mounted on top of it.

Figure 1:
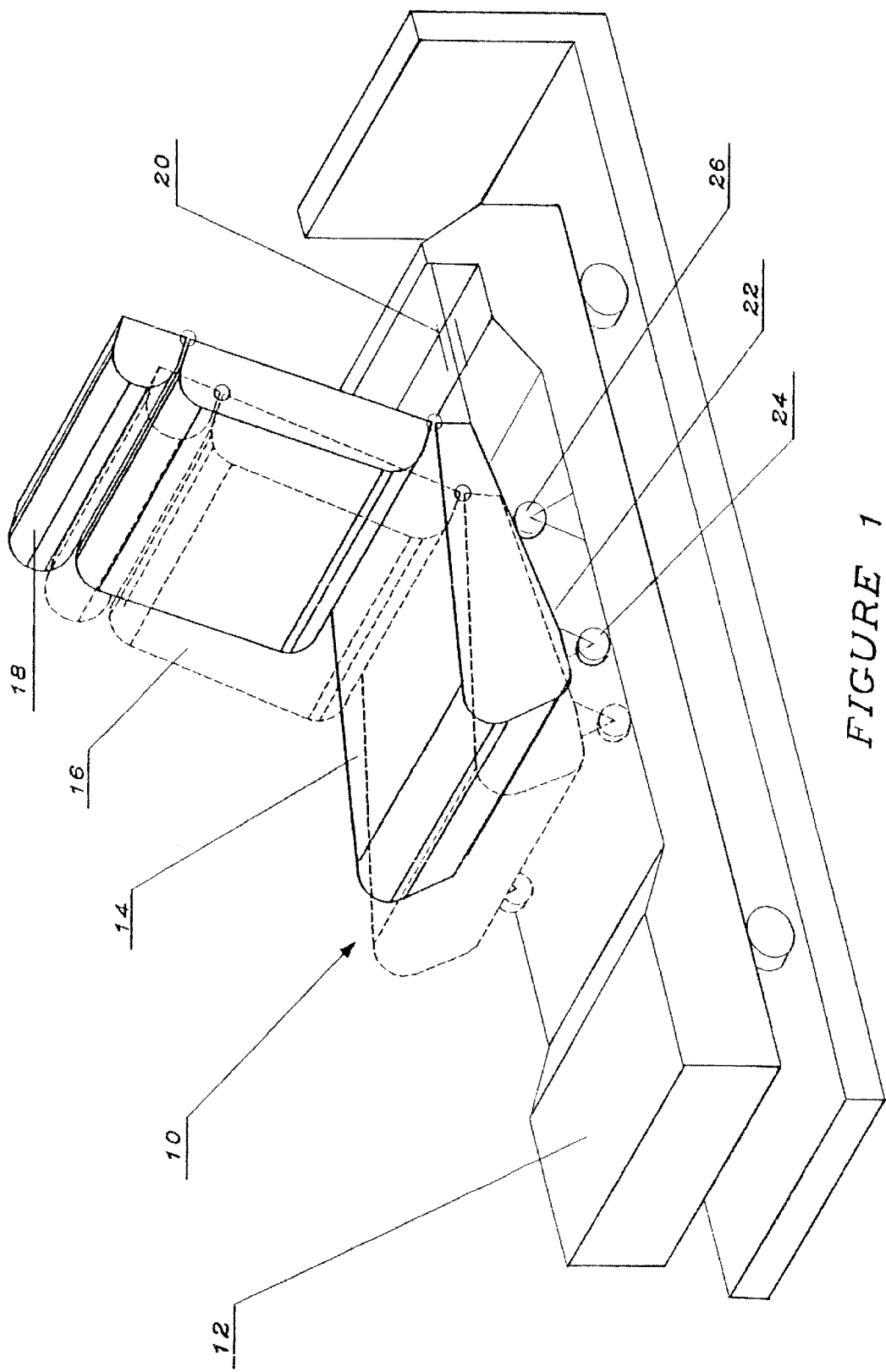
FIG. 1 is a schematic view of a vehicle safety system constructed and operative in accordance with one embodiment of the invention.
Figure 2:
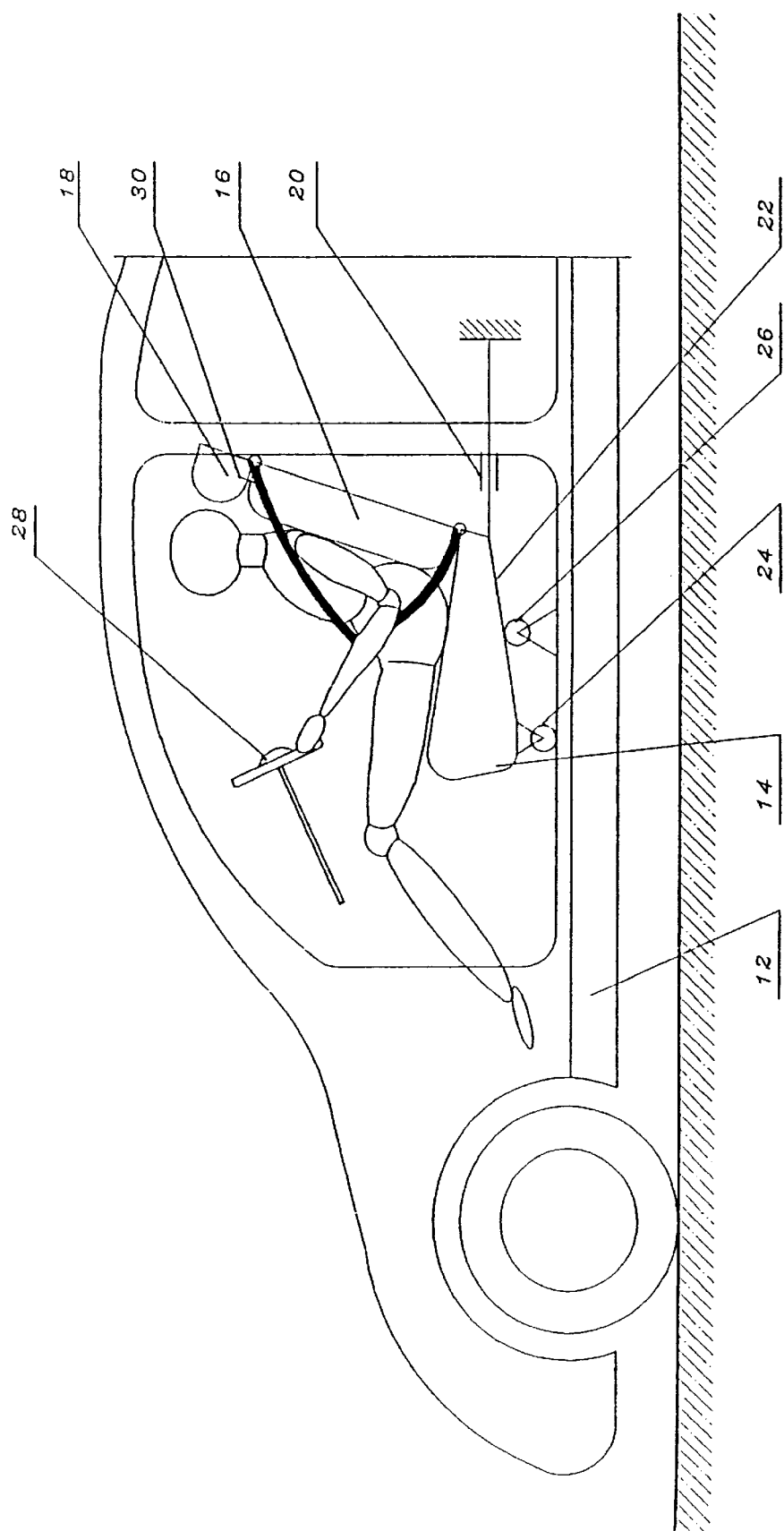
FIG. 2 is a schematic illustration of a rider in the safety system of FIG. 1 in an initial position.
Figure 3:
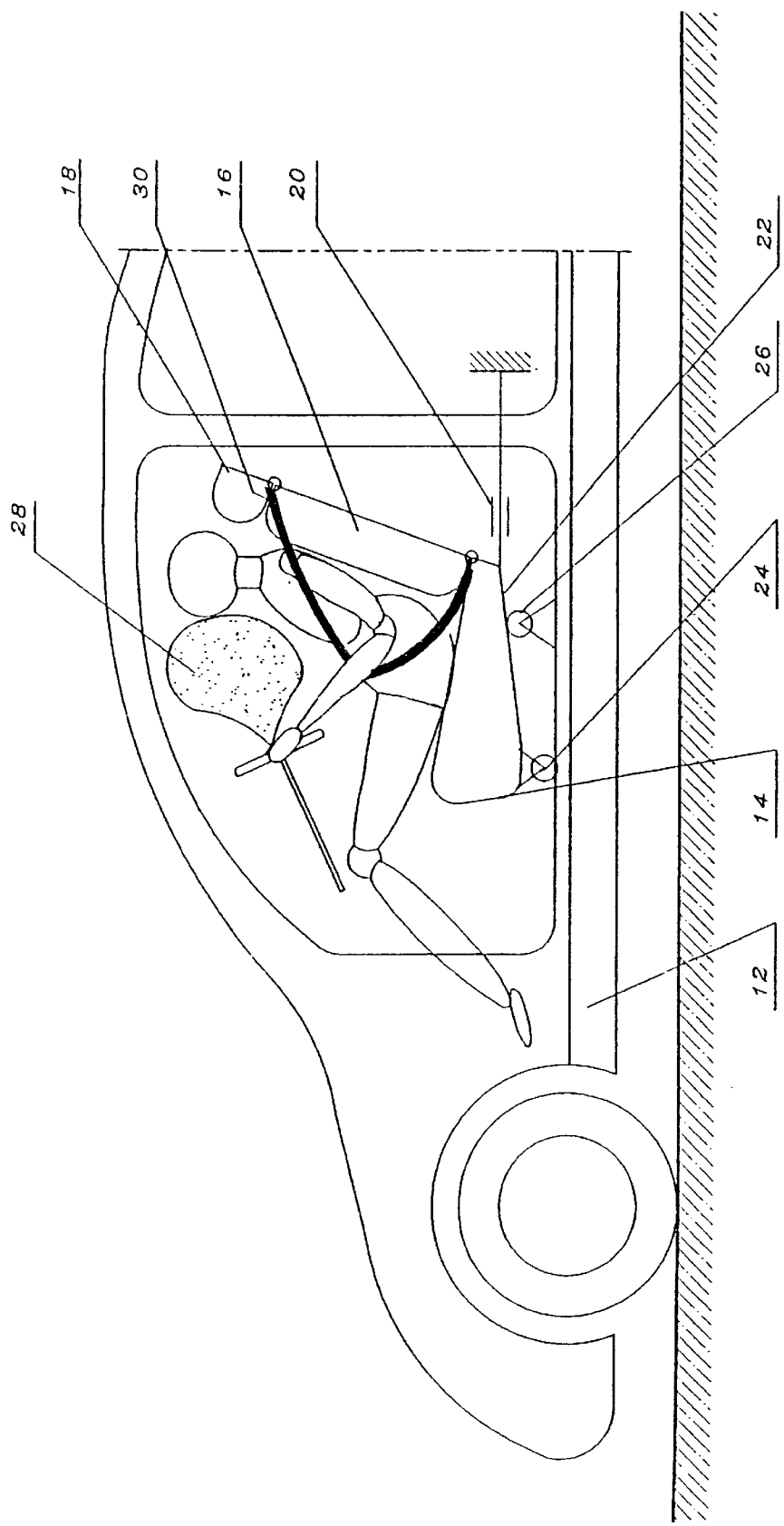
FIG. 3 is a schematic illustration of a rider in the safety system of FIG. 1 in an intermediate position.

Referring to FIGS. 1 and 2, there are shown respective perspective and side views of a vehicle safety system 10 constructed and operative in accordance with one embodiment of the invention, for providing protection in the event of a front collision. In FIG. 1, vehicle safety system 10 is shown mounted on a chassis 12 of a computerized vehicle simulator. Vehicle safety system 10 includes a seat 14 with a back support 16 and a head support 18. Seat 14 is slidably mounted on chassis 12. A non-linear spring damper system 20, described in detail hereinbelow, is coupled between seat 14 and chassis 12. Seat 14 includes a bottom surface 22, which defines an inclined plane relative to the chassis surface. In the chair's initial position, the front of the seat bottom is closer to a main horizontal axis of the chassis than the rear of the seat bottom. Substantially continuous contact between the vehicle chair and the chassis 12 is established by two sets of wheels, or other sliding support elements, 24 and 26. Mounted on the front bottom of the seat is a pair of wheels 24, attached to the seat and moving with it. Wheels 24 slide along a track affixed to the vehicle chassis 12 and maintain constant contact with it. This set of wheels serves also as a pivot for the chair's angular rotation mentioned above. The rear set of wheels 26 is attached to the chassis. The chair slides on wheels 26 in a track affixed to the inclined plane 22, maintaining a constant contact between them. The growing distance between the front and rear sets of wheels, as the chair moves forward, and the constant contact between the inclined plane 22 and the wheels 26, causes the chair to perform angular rotation with a growing radius in the direction opposite to the motion of the chair.

Alternatively, the seat bottom can define a curved surface, either concave or convex, along which wheels 26 roll, in order to impart a desired rotation of the chair, as long as the surface causes rotation in the direction opposite to the direction of motion of the chair. It will be appreciated that there are a number of other designs for providing angular rotation having a non-constant growing radius of the chair. For ease of description in the present application, all these possibilities will be referred to as an "inclined plane".

Figure 5:
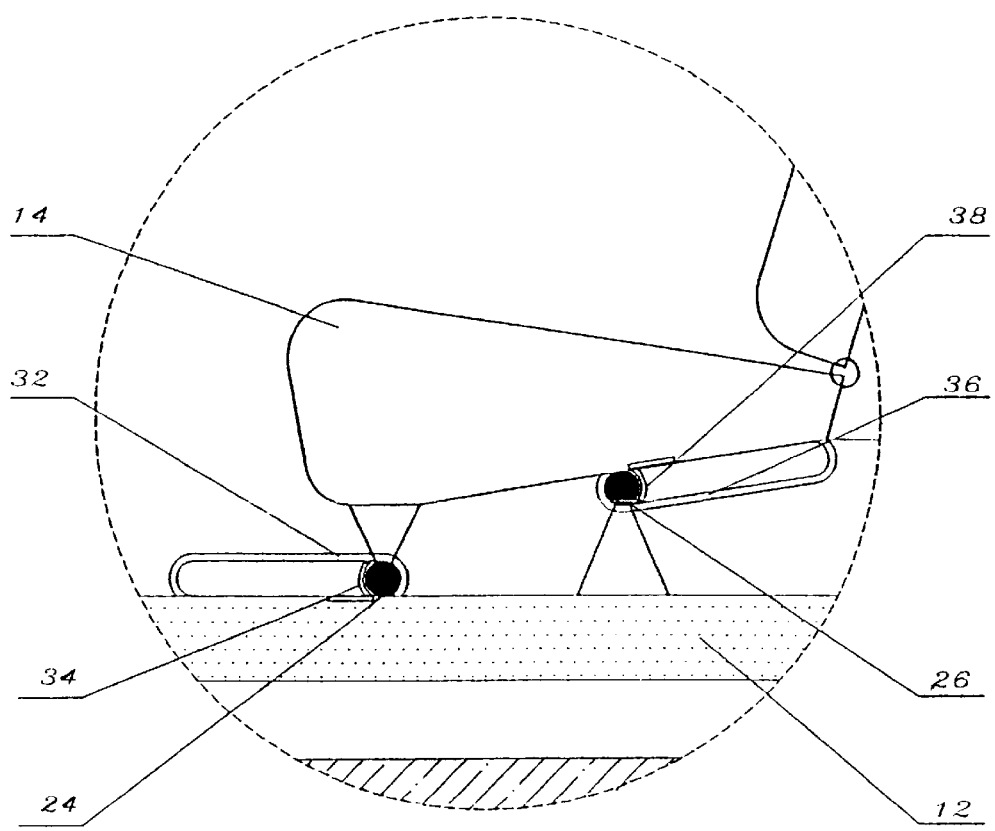
FIG. 5 is a detail illustration of a portion of the vehicle safety system of FIG. 1.

It will also be appreciated that there are a number of designs maintaining sliding contact between the seat 14 and the chassis 12 during such sliding motion. One possibility, shown by way of non-limiting example only, is shown schematically in FIG. 5. In this embodiment, a track 32 is formed in the chassis 12 under each side of seat 14. Wheel 24 is seated in track 23 and preferably retained in place by a frangible stop element 34. A similar track 36 is formed in the rear of each side of seat bottom 22. Wheels 26 is seated in track 36 and preferably retained in place by a frangible stop element 38. Stop elements 34 and 38 prevent chair movement under low decelerations, where air bags deployment is not justified. The stop elements are designed to break under deceleration forces above a pre-defined threshold on the chair.

A safety belt 30, seen in FIG. 2, is part of the vehicle safety system, and is affixed to the back support 16 and seat 14 of the chair. Thus, safety belt 30 slides along chassis 12 together with the chair, and is not affixed to the body of the chassis, as in conventional safety systems. An air bag 28 is provided in the vehicle, in steering wheel or dashboard.

It is a particular feature of the invention that, the air bag is not equipped to open and reach the rider before the rider is braked by the seat belt. Rather, the air bag preferably completes its deployment just before the rider seated on the moving chair encounters the air bag. Thus, the velocity at which the rider encounters the air bag will be, in this case, the relative velocity between the chair and chassis, depending on the controllable dynamic characteristics of the chair, rather than the deployment velocity of air bags fired towards rider's head and chest, as in conventional systems. Once the contact between the rider and air bag has been established, the mutual effects of the spring damper system and the air bag will absorb the kinetic energy of the rider and chair.

The time elapsed, from the instant of vehicle impingement to total rest, could be divided into two periods. (1) The time during which the vehicle deceleration increases up to its maximum value. (2) The time during which the vehicle deceleration decreases from its maximum value to total rest.

Due to the dynamic traits of the chair system mounted on the vehicle's chassis, it can be expected (and will be shown in the numerical example henceforth), that the vehicle chair dynamic response will be delayed and moderated at any time, compared to the respective vehicle input. In particular, at the point of time the vehicle (input) deceleration reaches its maximum value, (on the verge of declining), the vehicle chair deceleration, as well as the velocity and displacement relative to the chassis, will be substantially lower than that of the vehicle. This can be used as an exemplary basis to determine the timing of the rider-air bag encounter (i.e., when the rider first contacts the air bag). During period (1) or part of it, a rider will experience relatively low decelerations, and any kinetic energy associated with the chair and rider mass will be absorbed by the non-liner spring damper system. The rider-air bag encounter is preferably designed to close to the most likely point in time (for an average collision) when the vehicle-input deceleration will reach its maximum value. From then on, throughout period (2), the external "deceleration generator" declines, and the kinetic energy associated with chair and rider mass will be absorbed by the air bag and the non-linear spring damper system.

Figures 6A, 6B:
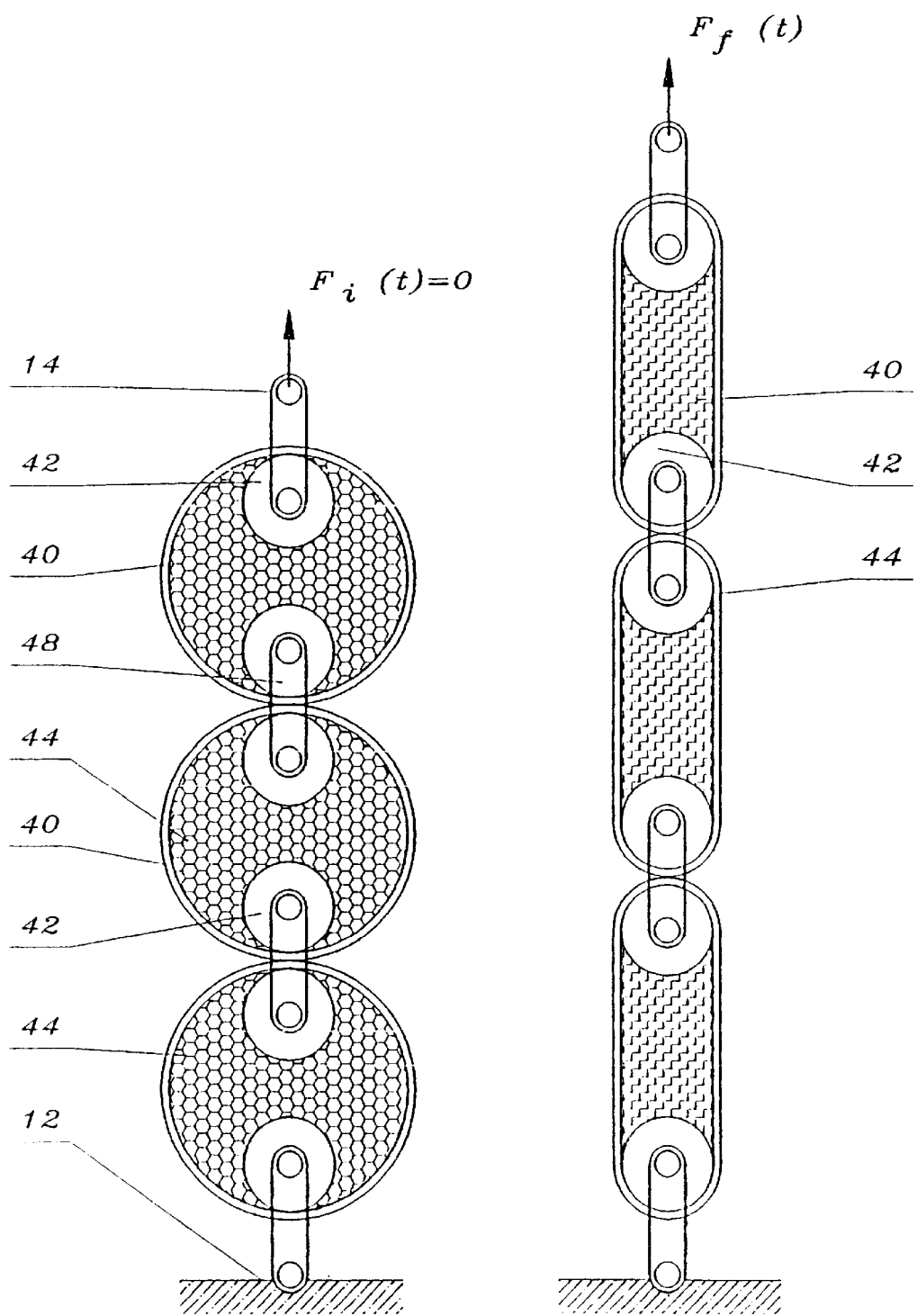
FIGS. 6a and 6b are schematic illustrations of a non-linear spring damper system constructed and operative in accordance with one embodiment of the invention in respective initial and final positions.

The movement of the chair and rider is constrained by a spring damper system 20, preferably a non-linear spring damper system, having gradually growing stiffness and/or damping coefficients. In other words, the stiffness coefficient can grow, while the damping coefficient remains constant, the damping coefficient can grow, while the stiffness coefficient remains constant, or both coefficients can grow gradually with displacement. It is a particular feature of the spring damper system of the intention that it is capable of large deformation. One example of a non-linear spring damper system suitable for the invention is shown in FIGS. 6a and 6b. The basic element is a thin-walled elastic plastic ring 40, preferably a short, thin walled cylinder, of circular or elliptical cross section. Two stiff cylinders 42 are attached to opposite sides of the inner side of the wall of ring 40. Ring 40 is filled with any energy absorbent materials 44, such as foam or a combination of foam and honeycomb. At present, energy absorbent material 44 is preferably polyethylene foam, whose density is selected in accordance with the desired performance of the spring damper system.

Any number of rings 40 may be connected in series or parallel by joining cylinders 42 of adjoining rings by rigid end connectors 48. Analysis and laboratory simulations can be used to determine the desired configuration. One end of the spring damper system is affixed to chassis 12, and the other is affixed to the back of seat 14. Preferably, two sets of spring-dampers are provided between the chassis and the seat.

It is a particular feature of the proposed non-linear spring damper system that its stiffness and/or damping coefficients gradually grow with stretching displacements applied to it. In other words, the resistance to stretching in its initial configuration, shown schematically in FIG. 6a, is substantially small compared to the resistance in the final configuration, shown schematically in FIG. 6b. Due to the structural nature of the initial geometry of the rings shown in FIG. 6a, the system is dominated mainly by bending elastic plastic energy. The growing displacement of the system reduces the bending energy component and raises the membrane energy component. In addition, the porous filler is compressed due to reduction of total volume inside the rings. Due to these structural traits, the growing displacement results in a gradual growth of stiffness and/or damping coefficients of the system, up to several orders of magnitude at the final geometry, shown in FIG. 6b. The stiff inner cylinders control the dependency between the displacement and the growing stiffness. Integrating this method in the vehicle safety system of the present invention avoids any sudden stop of the moving chair associated with undesired high decelerations, which can cause injury to riders in the vehicle.

While it is preferable to use the nonlinear spring damper system proposed herein, it should be noted that any other method of spring damper system, nonlinear or linear, may be alternatively be employed, without any reduction from the generality of the vehicle chair described above.

It will be appreciated that this nonlinear spring damper system described aforementioned is also useful in other applications, where mechanical damping with increasing stiffness is required.

EXAMPLE

For the sake of clarity and illustration of the vehicle rider safety system aforementioned, a case study of a frontal collision using a vehicle simulator will now be described.

We assumed a total weight of a chair and a rider of 120 kg distributed between the head support, back support and the seat, to simulate the human body weight distribution. Rotational moments of inertia were given to the different parts, accordingly.

For purposes of this example, we assumed an infinite rigidity causing the same kinematic parameters applied to the whole chassis. In fact, it is justified to assume reduced kinematic parameters applied to the system of the present invention, due to finite rigidity and some energy absorbed by the elastic plastic chassis structural materials. A criterion for the efficiency of the support system in the present study is the ratio of decelerations, safety system response versus vehicle input.

As a result of vehicle collision, we assume a time dependent deceleration having the shape of one half sine wave, with the maximum of $\alpha_{max}$ and the time duration T. The duration T is the time elapsed from the instant of vehicle bumper impingement to the time the vehicle is as rest. $V_0$ is the vehicle velocity at the instant of collision (t=0). $S_{max}$ is the distance the vehicle moved from the instant of collision to rest (from t=0 to t=T). The collision model requires the boundary conditions of, $\alpha(t)=S(t)=0$, $V(t)=V_0$ at t=0 and $\alpha(t)=V=(t)=0$, $S(t)=S_{max}$ at t=T.

These conditions yield the following equations.

$$T = -V_0\pi/(2a_{max}) \quad \text{Collision duration}$$

$$a(t) = a_{max}\sin(\pi t/T) \quad \text{Time dependent vehicle deceleration.}$$

$$V(t) = -a_{max}T/\pi \cdot \cos(\pi \cdot t/T) + (V_0 + a_{max} \cdot T/\pi) \quad \text{Time dependent vehicle velocity}$$

$$S(t) = -a_{max} \cdot (T/\pi)^2 \cdot \sin(\pi \cdot t/T) + (V_0 + a_{max}T/\pi)t \quad \text{Time dependent vehicle replacement}$$

Note: The only independent variables needed to determine the equations above are $V_0$ and $\alpha_{max}$.

We assume collision occurred at a vehicle velocity of $V_0$=1556 cm/sec (56 km/h) and contact conditions produce a maximum deceleration of $\alpha_{max}$=39240 cm/sec² (40 g). As a result, by using the equations above, we obtain collision duration of T=62*10⁻³ sec (62 m sec) and vehicle displacement (from impingement to rest) $S_{max}$=48 cm. The three characteristics of the vehicle collision $\alpha(t)$, $V(t)$, $S(t)$, are shown in FIGS. 7, 8, and 9 respectively. For the purpose of dynamic analysis of the system of the invention, we shall consider the vehicle to be a rigid body subjected to a dictated S(t).

The analysis of the simulated collision and its effect on the vehicle chair safety system was carried out using ADAMS, the general purpose Dynamic Analysis computer program, used widely by the automotive and aeronautical industry. The results are illustrated in FIGS. 10, 11, and 12. The analysis in the present example is focused on the critical point of rider-air bag encounter, namely the period of time from impingement up to the point of maximum vehicle deceleration. Thus, the effect of the spring damper system and the constrained trajectory by which the chair moves has been included in the analysis, overlooking the contribution of air bag, added to the system at period 2.

FIG. 10 is a graph illustrating the decelerations developed on different parts of the vehicle chair, and for comparison, the vehicle input deceleration. Due to the rotational component of chair motion, decelerations are given in the X direction (collinear with vehicle motion), and in the Y direction (normal to X). The same applies to the chair velocities and displacements relative to chassis, shown in FIGS. 11, 12.

It is noticeable that the decelerations developed on different parts of the chair are substantially lower and its peaks are delayed compared to the vehicle (input) decelerations. Moreover, the head support deceleration, simulating the human head, which is the most vulnerable part of the body, undergoes the lowest deceleration. The vehicle maximum deceleration is 39240 cm/sec² (40 g), which appears at t=32 m sec, where t is the time elapsed from the instant of collision. At the same point of time the deceleration developed on the chair is 23500 cm/sec² (40% less than the vehicle maximum). The chair maximum deceleration ranges from 27,000 to 30,500 cm/sec² in the X direction, and appears at t=47 m sec.

The air bag deployment is designed so as to have the first contact with the rider at an instant the vehicle deceleration passes its maximum value, namely the external "deceleration generator" influencing the chair response declines, in the present analysis, t ≧32 m sec. The effective velocity at which a rider contacts the air bag is, in this case, the chassis—chair relative velocity. In the present analysis, the respective relative velocities, at t=32 m sec, range from 360 to 510 cm/sec (13 to 18.4 km/h) and the respective relative chair—chassis displacements, in the X direction, range from 4 to 7 cm. (See FIGS. 11 and 12.) From now on, the non-linear spring damper system and the air bag mutually absorb the chair and riders' kinetic energy, while none of the energy absorbent components cause any unbearable sudden impacts.

Figure 13:
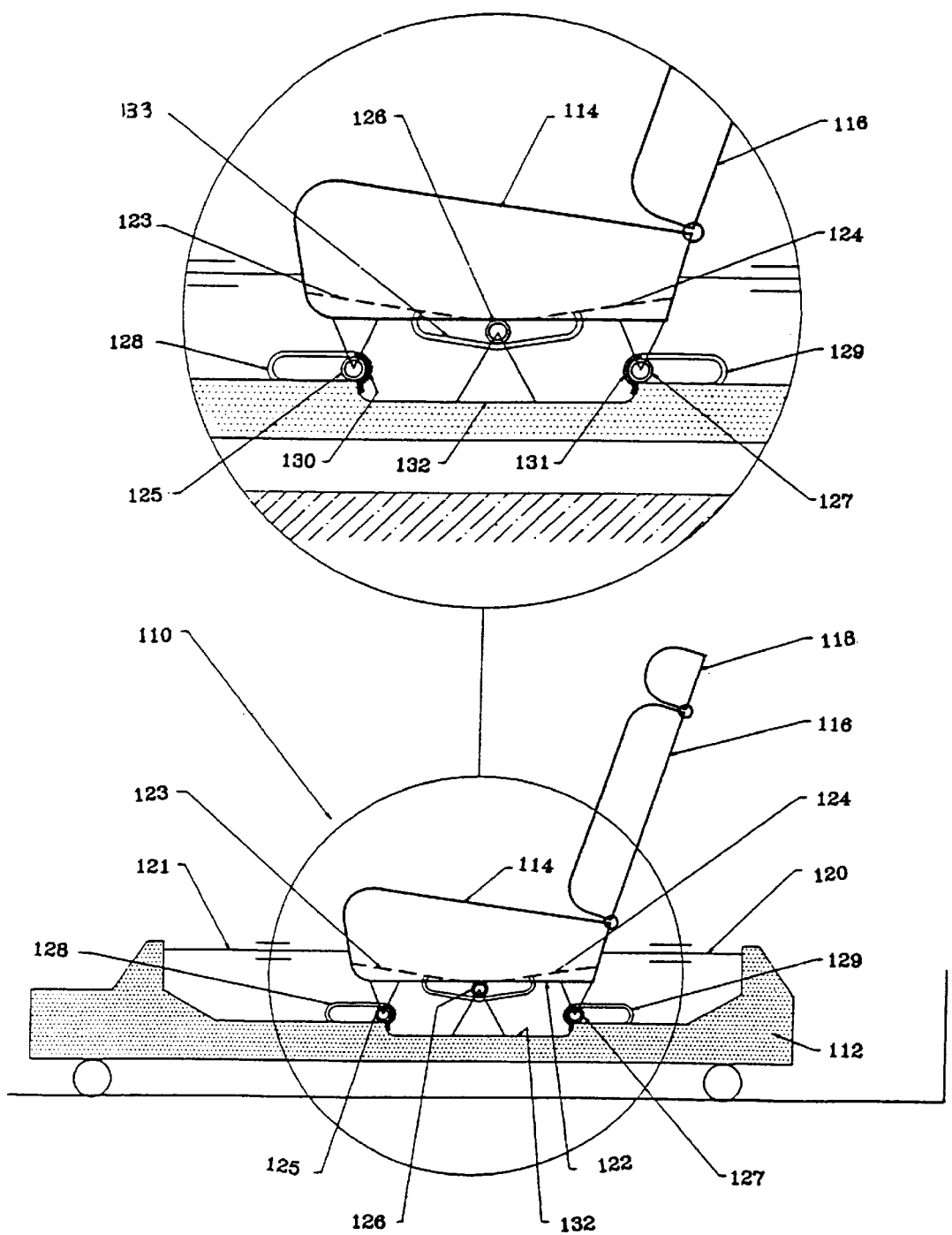
FIG. 13 is a schematic illustration of a vehicle safety system constructed and operative in accordance with a alternative embodiment of the invention, providing protection in the event of either a front end or rear end collision.
Figure 14A:
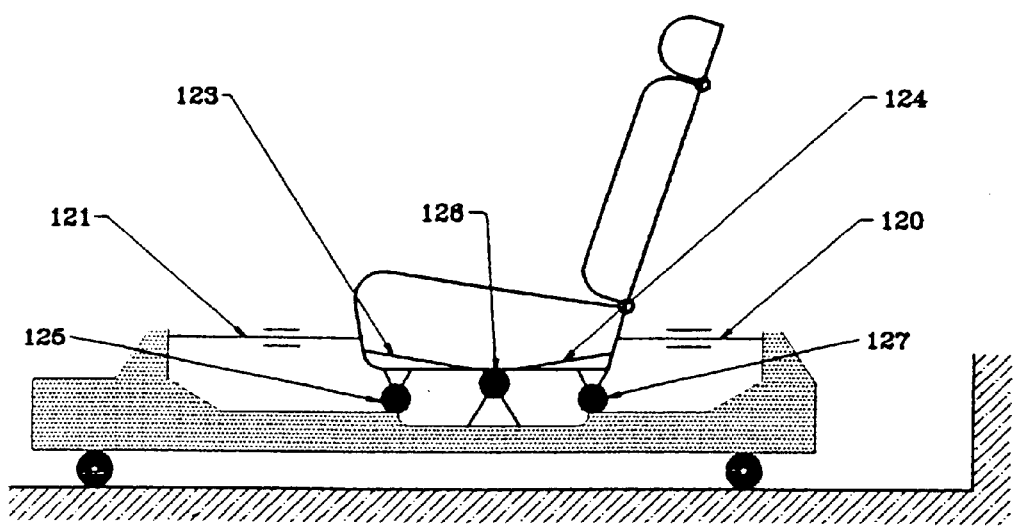
FIG. 14a is a schematic illustration of a chair in the safety system of FIG. 13 in an initial position.
Figure 14B:
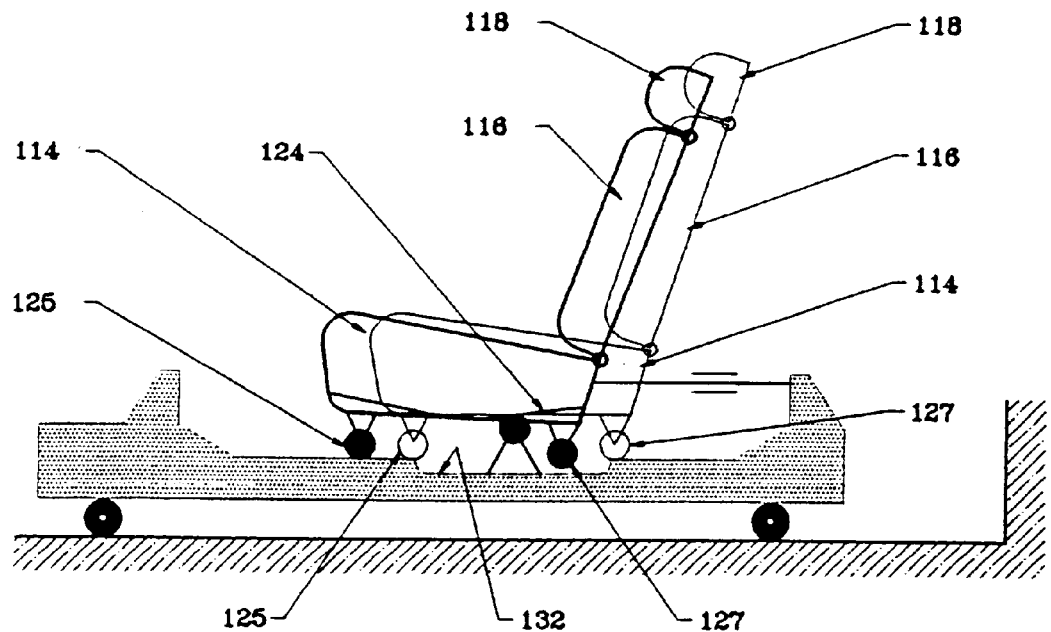
FIG. 14b is a schematic illustration of a chair in the safety system of FIG. 13 in an initial and final position in a front collision.
Figure 14C:
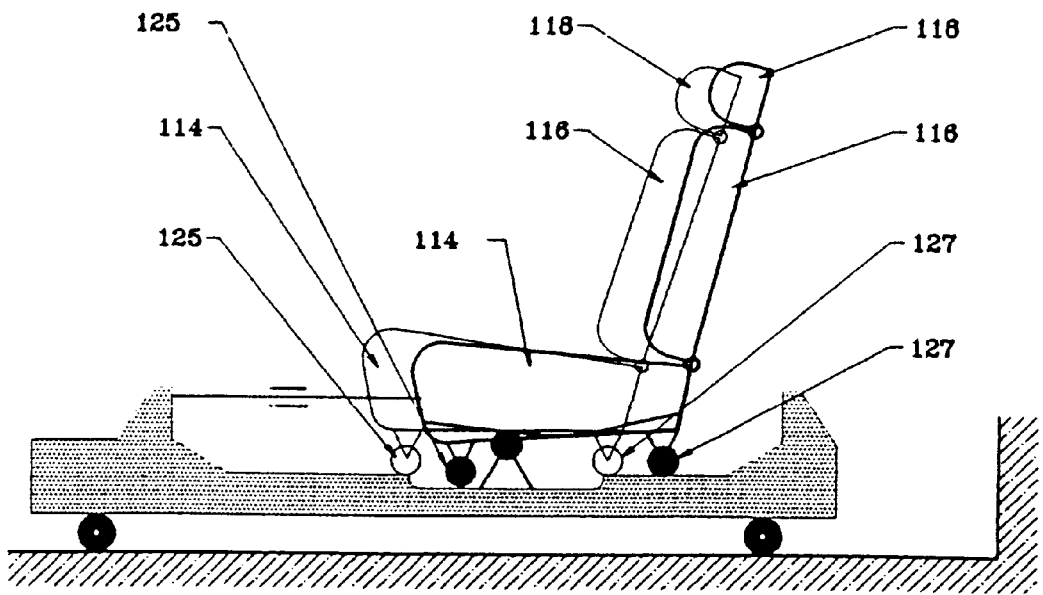
FIG. 14c is a schematic illustration of a chair in the safety system of FIG. 13 in an initial and final position in a rear end collision.

The above discussion refers only to protection in the vent of a frontal collision. In order to provide protection also in the event of a rear end collision, an alternative configuration of the invention is provided, and illustrated schematically in FIG. 13. In FIG. 13 there is shown a schematic side sectional illustration of a vehicle safety system 110 constructed and operative in accordance with a alternative embodiment of the invention, suitable for reducing injuries to the head and chest of a vehicle rider during a rear end collision, as well as during a substantially frontal collision. In FIG. 13, vehicle safety system 110 is shown mounted on a chassis 112 of a computerized vehicle simulator. Vehicle safety system 110 includes a seat 114 with a back support 116 and a head support 118. Seat 114 is slideably mounted on chassis 112. A pair of non-linear spring damper systems 120 and 121, as described hereinabove, are coupled between seat 114 and chassis 112. Non-linear spring damper system 120 is coupled, as shown in FIG. 1, between the back of seat 114 and the chassis, while non-linear spring damper system 121 is coupled between the front of seat 114 and the chassis. It will be appreciated that non-linear spring damper systems 120 and 121 are, by definition, tension only. This means that when force is exerted in one direction, the non-linear spring damper system is tensioned, and undergoes deformation, but when force is exerted in the opposite direction, the non-linear spring damper system becomes loose and free.

Seat 114 includes a bottom surface 122, which defines two inclined planes 124 and 124, as defined above, relative to the chassis surface. As can be seen, inclined planes 123 and 124 extend in the form of a V, with the front-most edge of inclined plane 123 and the rearmost edge of inclined plane 124 being farthest from the chassis. Substantially continuous contact between the vehicle chair and the chassis 112 is established by three sets of wheels, or other sliding support elements, 125, 126 and 127.

Mounted on the front bottom of the seat is pair of wheels 125, attached to the seat and moving with it. Wheels 125 slide along at rack 128 affixed to the vehicle chassis 112 and maintain constant contact with it. This set of wheels serves also as one pivot for the chair's angular rotation mentioned above. Mounted on the rear bottom of the seat is pair of wheels 127, attached to the seat and moving with it. Wheels 127 slide along another track 129 affixed to the vehicle chassis 112 and maintain constant contact with it. This set of wheels serves also as another pivot for the chair's angular rotation mentioned above.

The central set of wheels 126 is attached to the chassis. The chair slides on wheels 126 in a track 133 affixed between inclined planes 123 and 124, maintaining a constant contact between them. The growing distance between the front or rear, and the central sets of wheels, as the chair moves forward or backward, and the constant contact between the inclined plane 123 or 124 and the wheels 126, causes the chair to perform angular rotation with a growing radius in a direction opposite to the direction of motion of the chair. It will be appreciated that any alternative design providing angular rotation of the chair with a growing radius can also be utilized. As will be described in detail below, during sliding movement of the chair, one pair of wheels 125 and 127 will be disabled, depending upon the direction of the collision, so the chair will be supported only on wheels 126 and either wheels 125 or wheels 127.

It will be appreciated that there are a number of designs for maintaining sliding contact between the seat 114 and the chassis 112 during such sliding motion. One possibility, shown by way of non-limiting example only, can be seen schematically in FIGS. 13 and 15. In this embodiment, a groove 132 is formed in chassis 112 under the middle of seat 114. The bases of wheels 126 are fixedly mounted near the center of groove 132 in the chassis. The bottom surface 122 of seat 114 (or, more accurately, inclined planes 123 and 124) rests of wheels 126. Wheels 126 are free to slide within a track 133 on the bottom surface 122 of seat 114.

Wheels 125 and 127 are affixed to the front and rear, respectively, of bottom surface 122 of seat 114, here illustrated as near the side edges of the seat. Preferably, wheels 125 and 127 are held within tracks 128 and 129, and retained in place by frangible stop elements 130 and 132, respectively. Stop elements 130 and 132 prevent chair movement under low decelerations and low accelerations, where air bags deployment is not justified, and where little danger of whiplash is expected. The stop elements are designed to break under deceleration forces above a pre-defined threshold on the chair, stop element 132 in the case of a frontal collision, and stop element 130 in the case of a rear end collision, thereby disabling wheels 125 or 127 rolling therein.

Figure 15:
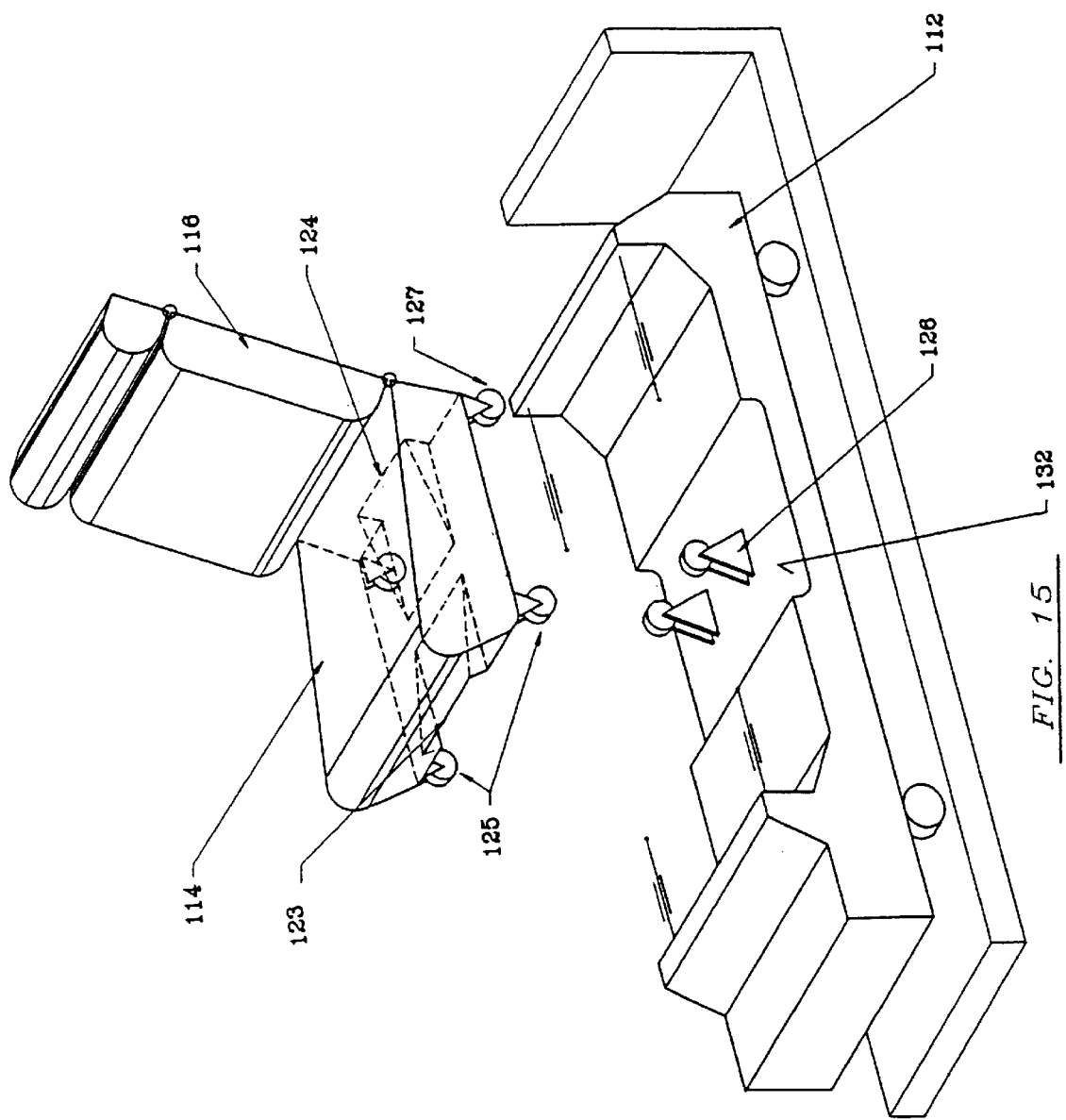
FIG. 15 is an exploded view of a portion of one embodiment of the vehicle safety system of FIG. 13.

According to the preferred embodiment illustrated in FIG. 15, inclined planes 123 and 124 are formed only in the central region of the seat bottom. In this way, wheels 125 and 127 can be affixed to the sides of the seat bottom and arranged to rest on the chassis adjacent groove 132, so as not to interfere with wheels 126. It will be appreciated that a vehicle safety system for protection during a rear-end collision can be provided independently of protection during a front end collision. In this case, for example, the seat bottom can have an inclined plane wherein the rear of the seat is closer to a main horizontal axis of the chassis than the front of the seat bottom, and wherein only a single spring damper system is provided, coupling the front of the seat with the chassis.

Operation of this embodiment, and a comparison with a substantially front collision as described above, will now be described with reference to FIGS. 4a, 4b and 4c.

As can be seen, in the initial position, during normal driving, as illustrated in FIGS. 1 and 13, all the wheels are in their respective tracks, neither non-linear spring damper system is tensioned, and wheels 125 and 127 rest on the chassis, adjacent groove 132. Wheels 126 have some freedom of movement within track 133.

Figure 4:
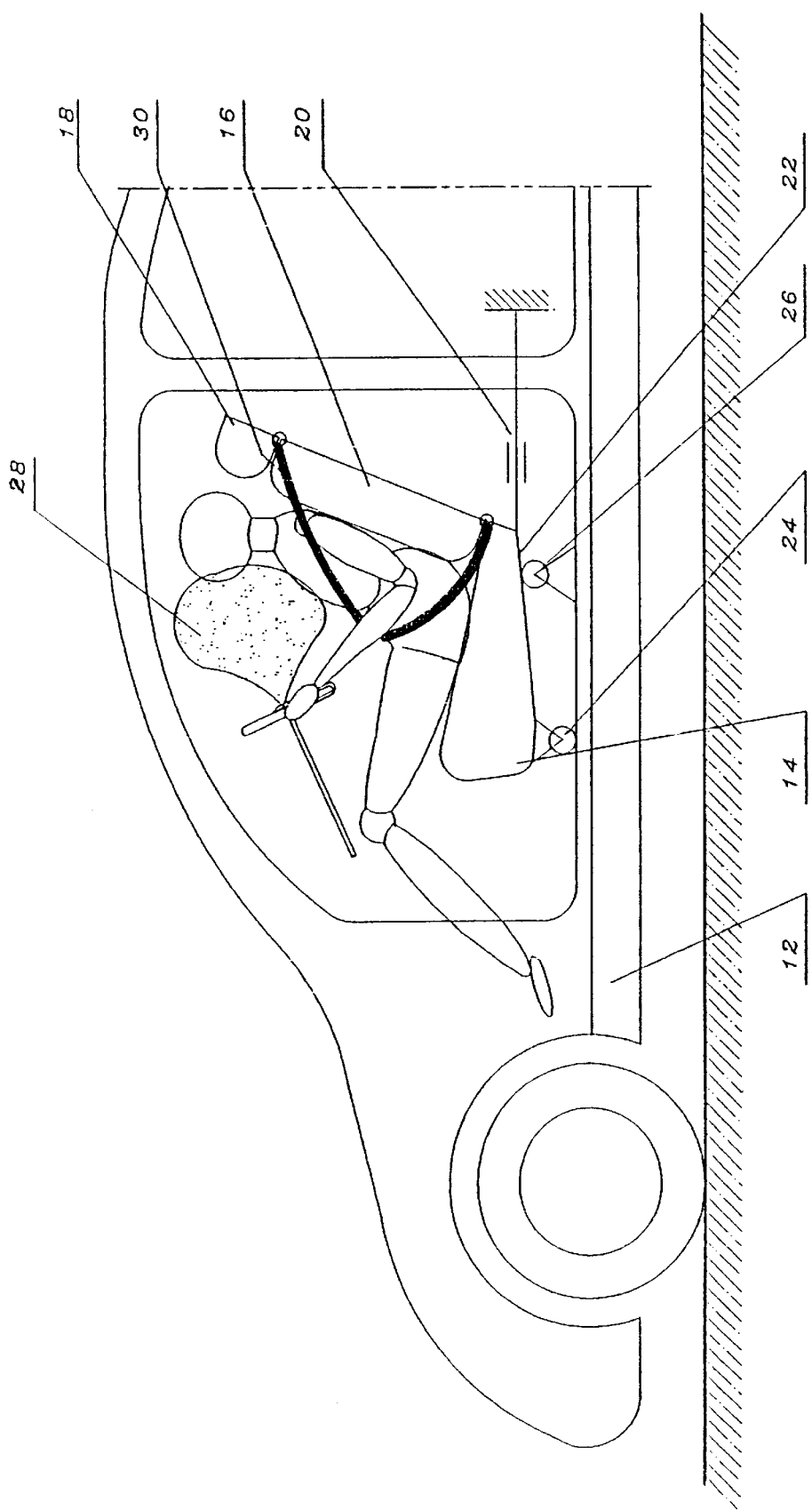
FIG. 4 is a schematic illustration of a rider in the safety system of FIG. 1 in a final position.

In the event of a substantially frontal collision, as shown in FIG. 4b, the chassis continues to move forwards as it slows down, and the vehicle chair also moves forwards, i.e., in a direction coinciding with the vehicle motion. The inertial forces cause wheels 127 to roll forward and break frangible elements 131. Since wheels 127 are disabled above groove 132, seat 114 is solely supported on wheels 125 in track 128, and 126 on inclined plane 124. As wheels 126 roll along inclined plane 124, the chair undergoes angular rotation having a non-constant growing radius in the direction opposite to the chair motion. Thus, as can be seen, the head support undergoes the smallest displacement, lowest velocity, and smallest deceleration.

Referring now to FIG. 4c, there is illustrated the result in the event of a rear end collision when the vehicle was standing substantially still, or when the vehicle is moving forwards. In this case, the chassis moves forwards to the impact, while the vehicle chair moves backwards, i.e., in a direction opposite to the vehicle motion. The inertial forces cause wheels 125 to break frangible elements 130. Since wheels 125 are now disabled above groove 132, seat 114 is solely supported on wheels 127 in track 129 and 126 on inclined plane 123. As wheels 126 roll along inclined plane 123, the chair undergoes angular rotation having a non-constant growing radius in the direction opposite to the chair motion. In other words, the angular movement brings the back support towards an upright position, thereby bringing the head support closer to the rider's head. Thus, here too, the head support undergoes the smallest displacement, lowest velocity, and smallest acceleration. In addition, the non-linear spring damper system and the motion of the seat absorb a large amount of the energy of the collision. Thus, injuries to the spinal column, the back of the neck, and the head, including the likelihood of whiplash, will be substantially reduced.

It is a particular feature of the present invention that, in either scenario of a front end collision or a rear end collision, a rider's head and neck are subjected to the lowest acceleration or deceleration of the body, and undergo the smallest displacement before being stopped by an airbag or a head support. This results in a significant improvement in the protection provided by the security system, as compared to conventional systems.

It will be appreciated that the invention is not limited to what has been described hereinabove merely by way of example. Rather, the invention is limited solely by the claims, which follow.

What I claim is:

1. A safety system for a motor vehicle, the system comprising:
   a chassis;
   a vehicle seat mounted on the chassis for slidable linear movement relative to the chassis, under inertial forces above a pre-selected threshold, said vehicle seat arranged for angular rotation through a gradually growing radius, simultaneously with, and in a direction opposite to, the slidable linear movement of the vehicle seat;
   a seat belt affixed to said vehicle seat; and
   a spring damper system, which provides energy absorption, coupling said seat to the chassis, the spring damper system being capable of undergoing large, substantially plastic deformation.

2. The safety system as claimed in claim 1, wherein said spring damper system includes a non-linear spring damper system having resistance under tension only, and having a stiffness coefficient and a damping coefficient which grow gradually with displacement of said vehicle seat relative to the chassis.

3. The safety system as claimed in claim 1, wherein said non-linear spring damper system includes a plurality of thin-walled, elastic plastic rings filled with energy absorbent materials, two rigid cylinders mounted at opposite sides of each of said rings; and rigid end connectors coupled to said rigid cylinders for coupling said thin-walled rings.

4. The safety system as claimed in claim 3, wherein said energy absorbent materials include energy absorbent foam.

5. The safety system as claimed in claim 3, wherein said energy absorbent materials include polyethylene foam.

6. The safety system as claimed in claim 3, wherein said energy absorbent materials include polyethylene foam in a plastic honeycomb frame.

7. The safety system as claimed in claim 3, wherein the stiffness coefficient and the damping coefficient of the spring damper system grow gradually with displacement of said vehicle seat relative to the chassis.

8. The safety system as claimed in claim 3, wherein the stiffness coefficient of the spring damper system grows gradually with displacement of said vehicle seat relative to the chassis and the damping coefficient is constant.

9. The safety system as claimed in claim 1, wherein said spring damper system includes a non-linear spring damper system having resistance under tension, and having a stiffness coefficient which grows gradually with displacement of said vehicle seat relative to the chassis, and a constant damping coefficient.

10. The safety system as claimed in claim 1, for a front end collision, further comprising:
    means for angular rotation through a gradually growing radius, simultaneously with, and in a direction opposite to, the slidable linear movement of the vehicle seat, said means including a vehicle seat bottom defining, in an initial position, an upwardly inclined plane relative to the chassis, a front edge of said seat bottom being closer to a main horizontal axis of the chassis than a rear edge of said seat bottom;
    a first support mounted on said front edge of said seat bottom for movement along, and substantially continuous engagement with, the chassis; and
    a second support mounted on the chassis for movement along, and substantially continuous engagement with, said inclined plane.

11. The safety system as claimed in claim 10 for a front end collision, wherein the system further includes:
    at least one track affixed to the chassis;
    said first support element on said front edge of said seat bottom being arranged for sliding movement along the track affixed to the chassis; and
    at least one track affixed to the inclined plane on the seat bottom;
    said second support element on said chassis being arranged for sliding along the track affixed to the inclined plane.

12. The safety system as claimed in claim 11, wherein each of said tracks includes a frangible portion arranged to break under identical forces above a pre-selected threshold.

13. The safety system as claimed in claim 1, for a rear end collision, further comprising:
    means for angular rotation through a gradually growing radius, simultaneously with, and in a direction opposite to, the slidable linear movement of the vehicle seat, said means including a vehicle seat bottom defining, in an initial position, an upwardly inclined plane relative to the chassis, a rear edge of said seat bottom being closer to a main horizontal axis of the chassis than a front edge of said seat bottom;
    at least one support mounted on said rear edge of said seat bottom for movement along, and substantially continuous engagement with, the chassis; and
    a second support mounted on the chassis for movement along, and substantially continuous engagement with said inclined plane.

14. The safety system as claimed in claim 13 for a rear end collision, and the system further includes:
    at least one track affixed to the chassis;
    said first support element on said rear edge of said seat bottom being arranged for sliding movement along the track affixed to the chassis; and
    at least one track affixed to the inclined plane on the seat bottom;
    said second support element on said chassis being arranged for sliding along the track affixed to the inclined plane.

15. The safety system as claimed in claim 14, wherein each of said tracks includes a frangible portion arranged to break under inertial forces above a pre-selected threshold.

16. The safety system as claimed in claim 1, for a front or rear end collision, wherein:
    said chassis includes a central groove;
    and further comprising:
    means for angular rotation through a gradually growing radius, simultaneously with, and in a direction opposite to, the slidable linear movement of the vehicle seat, said means including a vehicle seat bottom defining, in an initial position, a front and rear upwardly inclined planes, relative to the chassis, extending from a front edge of said seat bottom to a rear edge of said seat bottom in the form of a V, with the center of the V being closest to a main horizontal axis of the chassis, and the system further includes:
  a first support mounted near said front edge of the seat;
  a second support mounted near said rear edge of the seat;
  a third support mounted in said groove in the chassis; and
  wherein, during a front end collision, said first support is arranged for selective movement along, and substantially continuous engagement with the chassis, said third support is arranged for movement along, and substantially continuous engagement with, said rear inclined plane, and said second support is disabled; and, during a rear end collision, said second support is arranged for selective movement along, and substantially continuous engagement with the chassis, said third support is arranged for movement along, and substantially continuous engagement with, said front inclined plane, and said first support is disabled.

17. The safety system as claimed in claim 16, further including:
  at least first and second tracks affixed to the chassis;
  said first support element attached to the front edge of the vehicle seat bottom being arranged for sliding movement along the first track affixed to the chassis;
  said third support element attached to the front edge of the vehicle seat bottom being arranged for sliding movement along the second track affixed to the chassis; and
  at least one track affixed to said inclined planes on said seat bottom;
  said second support element on said chassis being arranged for sliding along the track affixed to the inclined plane.

18. The safety system as claimed in claim 18, wherein each of said first and second tracks affixed to the chassis includes a frangible portion arranged to break under inertial forces above a pre-selected threshold in one direction.

19. A safety system for a motor vehicle, the system comprising:
  a chassis;
  a vehicle seat mounted on the chassis for slidable linear movement relative to the chassis under inertial forces above a pre-selected threshold, said vehicle seat having a bottom defining at least one inclined plane relative to the chassis, an edge of the seat bottom being closer to a main horizontal axis of the chassis than a center of the seat bottom;
  a seat belt affixed to said vehicle seat;
  a spring dampener system, which provides energy absorbent displacement, coupling said seat to the chassis, the spring dampener system being capable of undergoing large deformations;
  at least one support mounted on the seat for movement along, and substantially continuous engagement with, the chassis; and
  a second support mounted on the chassis for movement along, and substantially continuous engagement with, one of said inclined plane.

20. The safety system as claimed in claim 19, wherein said vehicle seat has sa bottom defining one inclined plane, the front of the seat bottom being closer to a main horizontal axis of the chassis than the rear of the seat bottom, and the system further includes:
  a first support mounted on the seat for movement along, and substantially continuous engagement with, the chassis; and
  a second support mounted on the chassis for movement along, and substantially continuous engagement with, the inclined plane.

21. A method for reducing deceleration during a substantially frontal collision on a rider in a vehicle seat in a motor vehicle having a chassis and an air bag, the method comprising the steps of:
  retaining the rider in the vehicle seat by means of a seat belt affixed to the vehicle seat;
  slidably mounting the vehicle seat on the chassis for slidably linear movement relative to the chassis under inertial forces above a pre-selected threshold which justifies deployment of the air bag;
  wherein the vehicle seat slides in a constrained trajectory relative to the vehicle chassis, the trajectory being a combination of linear motion, and angular rotation having a non-constant, growing radius in the direction opposite to the motion of the vehicle seat; and
  when the vehicle suddenly decelerates, causing the vehicle seat to slide in said constrained trajectory while restrained by a spring damper system capable of undergoing large, substantially plastic deformation.

22. A method for reducing deceleration during a substantially front collision on a rider in a vehicle seat in a motor vehicle having a chassis and an air bag, the method comprising the steps of:
  retaining the rider in the vehicle seat by means of a seat belt affixed to the vehicle seat;
  slidably mounting the vehicle seat on the chassis for slidably linear movement relative to the chassis under inertial forces above a pre-selected threshold which justifies deployment of the air bag, said step of slidably mounting includes slidably mounting the vehicle seat on the chassis for slidably forward movement relative to the chassis under inertial forces above a pre-selected threshold which justifies deployment of the air bag, and
  when the vehicle suddenly decelerates, causing the vehicle seat to slide in said constrained trajectory while restrained by a spring damper system capable of undergoing large, substantially plastic deformation and causing the vehicle seat to slide forward when restrained by a spring damper system capable of undergoing large deformations, so that the rider contacts the air bag after the air bag has deployed completely.

23. A method for reducing deceleration during a substantially frontal collision on a rider in vehicle seat in a motor vehicle having a chassis and an air bag, the method comprising the steps of:
  retaining the rider in the vehicle seat by means of a seat belt affixed to the vehicle seat;
  slidably mounting the vehicle seat on the chassis for slidably linear movement relative to the chassis under inertial forces above a pre-selected threshold which justifies deployment of the air bag; and
  when the vehicle suddenly decelerates, causing the vehicle seat to slide in said constrained trajectory while restrained by a spring damper system capable of undergoing large, substantially plastic deformation wherein the rider contacts the air bag at a velocity equal to the velocity of the vehicle seat relative to the chassis.

24. A method for reducing deceleration during a substantially frontal collision on a rider in a vehicle seat in a motor vehicle having a chassis and an air bag, the method comprising the steps of:
  retaining the rider in the vehicle seat by means of a seat belt affixed to the vehicle seat;
  slidably mounting the vehicle seat on the chassis for slidably linear movement relative to the chassis under inertial forces above a pre-selected threshold which justifies deployment of the air bag;
  the vehicle seat slides in a constrained trajectory relative to the vehicle chassis, the trajectory being a combination of linear and angular rotation having a nonconstant growing radius in the direction opposite to the motion of the vehicle seat, wherein said angular rotation is created by:
    providing said vehicle seat with a bottom defining an inclined plane, the front of the seat bottom being closer to a main horizontal axis of the chassis than the center] of the seat bottom in an initial position;
    mounting a first support on said vehicle seat for movement along the chassis; and
    mounting a second support on the chassis for movement along the inclined plane;
  whereby forwards movement of said vehicle seat relative to the chassis causes said first support to move along the chassis in substantially continuous engagement therewith, and causes said second support to move along the inclined plane, in substantially continuous engagement therewith; and
  when the vehicle suddenly accelerates, causing the vehicle seat to slide linearly while restrained by a spring dampener system capable of undergoing large deformations.

25. A method for reducing acceleration during a rear end collision on a rider in a vehicle seat in a motor vehicle having a chassis, the method comprising the steps of:
  retaining the rider in the vehicle seat by means of a seat belt affixed to the vehicle seat;
  slidably mounting the vehicle seat on the chassis for slidable linear rearwards movement relative to the chassis under inertial forces above a pre-selected threshold; and
  when the vehicle suddenly accelerates, causing the vehicle seat to slide rearwardly when restrained by a spring damper system capable of undergoing large deformations, so that a head of the rider contacts the head support of the vehicle seat after it has moved closer to the rider's head.

26. The method as claimed in claim 25, wherein the vehicle seat slides in a constrained trajectory relative to the vehicle chassis, the trajectory being a combination of linear linear, and angular rotation having a non-constant, growing radius in the direction opposite to the motion of the vehicle seat.

27. The method as claimed in claim 25, wherein said angular rotation is created by:
  providing said vehicle seat with a bottom defining two inclined planes extending in the form of a V, with the center of the V being closest to a main horizontal axis of the chassis, and the method further includes:
    mounting at least one support on the seat for movement along, and substantially continuous engagement with, the chassis; and
    mounting a second support on the chassis for movement along, and substantially continuous engagement with, one of said inclined planes;
  whereby linear movement of said vehicle seat relative to the chassis causes one said support to move along the chassis in substantially continuous engagement therewith, and causes said second support to move along said inclined plane, in substantially continuous engagement therewith.

* * * * *